(12) United States Patent
Shibata

(10) Patent No.: US 6,704,490 B1
(45) Date of Patent: Mar. 9, 2004

(54) INFORMATION RECORDER/REPRODUCER

(75) Inventor: Hideyo Shibata, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 413 days.

(21) Appl. No.: 09/890,130

(22) PCT Filed: Nov. 24, 2000

(86) PCT No.: PCT/JP00/08333

§ 371 (c)(1),
(2), (4) Date: Jul. 27, 2001

(87) PCT Pub. No.: WO01/41456

PCT Pub. Date: Jun. 7, 2001

(30) Foreign Application Priority Data

Nov. 29, 1999 (JP) .......................................... 11-337381

(51) Int. Cl.$^7$ .............................. H04N 5/91; G11B 5/02
(52) U.S. Cl. .............................. 386/46; 386/95; 386/96; 386/108; 360/18; 360/27; 360/48
(58) Field of Search .............................. 386/46, 58, 59, 386/73, 78, 79, 80, 81, 14, 108, 95, 96; 360/27, 73.07, 18, 48; 369/47.28, 47.41

(56) References Cited

U.S. PATENT DOCUMENTS

| | | | | |
|---|---|---|---|---|
| 5,307,171 A | * | 4/1994 | Azuma et al. ............... | 386/131 |
| 5,434,677 A | * | 7/1995 | Oikawa ........................ | 386/74 |
| 5,499,145 A | * | 3/1996 | Azuma et al. ............... | 386/123 |
| 5,642,457 A | * | 6/1997 | Higurashi .................... | 386/35 |
| 5,696,866 A | * | 12/1997 | Iggulden et al. ............... | 386/46 |
| 5,719,721 A | * | 2/1998 | Iizuka et al. ................ | 360/72.2 |
| 5,966,494 A | * | 10/1999 | Iwamoto ........................ | 386/4 |

FOREIGN PATENT DOCUMENTS

| | | |
|---|---|---|
| JP | 3-127571 A | 5/1991 |
| JP | 4-20187 A | 1/1992 |
| JP | 4-326268 A | 11/1992 |

* cited by examiner

Primary Examiner—Vincent Boccio
Assistant Examiner—James A Fletcher
(74) Attorney, Agent, or Firm—Smith Patent Office

(57) ABSTRACT

Video signals are recorded according to the number of tracks corresponding to the broadcasting system for each basic unit. When control signals are recorded on a magnetic tape in the longitudinal direction, the duty ratio of the control signals for every N tracks recorded for each basic unit has a value different from that of the duty ratio of other control signals. At the time when the magnetic tape 1 is reproduced CTL signals are obtained by forming waveforms of the reproduced amplified outputs by means of a waveform formation unit 6. A CTL signal duty ratio determination unit 9 detects the border of a frame in accordance with the duty ratio. A broadcasting a system determination unit 10 determines the broadcasting system based on the counting result of the CTL signals during one frame that has been counted by the CTL signal counting unit 9. Thereby, it is made possible to record and to reproduce programs of a differing broadcasting system by using an information recorder/reproducer of which the number of revolutions of the rotating cylinder and the transfer speed of the magnetic tape are the same.

7 Claims, 9 Drawing Sheets

INFORMATION RECORDER/REPRODUCER

BACKGROUND OF THE INVENTION

1. Field of the Invention

The present invention relates to an information recorder/reproducer which compresses video signals for each basic unit of one field or one frame so that the compressed video data are recorded on or reproduced from a plurality of tracks on a magnetic tape per basic unit.

2. Discussion of the Related Art

Conventionally, video signals are inputted to a generally utilized helical scan-type information recorder/reproducer (hereinafter referred to as a VTR) which scans in a helical manner with a magnetic head attached to a rotating cylinder and, thereby, the data thereof are recorded on a magnetic tape. In this case, since video signals of one field are, conventionally, recorded on one track, the recording is carried out by changing the number of revolutions of the rotating cylinder or by changing the transfer speed of the magnetic tape in accordance with the difference of the frequency of the vertical synchronizing signal due to a broadcasting system such as an NTSC system or a PAL system. In addition, at the same time, control signals are recorded corresponding to each track in the longitudinal direction of the magnetic tape by means of a fixed head.

In order to make the phase relationships between the tape transfer at the time of reproduction and the revolution of the rotating cylinder correspond to the relationships at the time of recording, control signals and FG signals are used. An FG signal generation circuit generates signals which are proportional to the number of revolutions of the capstan and the frequency thereof is proportional to the transfer speed of the magnetic tape. At the time of reproduction the control signals are reproduced by the fixed head so as to count the FG signals generated within a period of the control signals. By comparing this measurement result with a predetermined value, the broadcasting system of the recorded program can be determined.

On the other hand, in the case of an information recorder/reproducer such as a digital VTR, the inputted video signals are compressed for each basic unit of one field or one frame and the compressed video data are signal converted and given to the magnetic head of the rotating cylinder so as to be recorded in a plurality of tracks per basic unit. At this time, in order to minimize the difference in the signal processing between the NTSC system and the PAL system, there is a method for making the number N of tracks for recording per basic unit be of a ratio of NTSC:PAL=5:6. According to this method the number of revolutions of the rotating cylinder and the transfer speed of the magnetic tape can be made approximately the same.

For example, in a method for changing the number N of tracks per basic unit in accordance with the difference in the broadcasting system, such as in a digital VTR, the number N of tracks used for one frame is made to be 5n or 6n (n is a natural number) in the NTSC system or in the PAL system, respectively, in the case that the basic unit of the compressed video data is one frame. FIGS. 1 and 2 show the relationships between the frame signals as well as head switching signals (HSW signals) and the track tracing in the case of n=2. In the NTSC system shown in FIG. 1, the frame period is 33.366 ms. In the PAL system shown in FIG. 2, the frame period is 40.000 ms.

In the NTSC system, when video data are recorded in ten tracks 43 by using a magnetic head attached to a rotating cylinder during one period of the frame signals 41, HSW signals 42 for switching the magnetic head are switched in polarity thereof for every 3.37 ms. In the PAL system, when video data are recorded in twelve tracks 44 during one period of frame signals 41, HSW signals 42 are switched in polarity thereof for every 3.33 ms. That is to say, the ratio of the number N of tracks for recording per one frame of the NTSC system to that of the PAL system is made to be 5:6, the ratio of the number of revolutions of the rotating cylinder and the transfer speed of the magnetic tape becomes (1.000:1.001), which is approximately the same.

In such an information recorder/reproducer, as well, control signals are recorded by a fixed head in the longitudinal direction of a magnetic tape. When the control signals are reproduced by the fixed head, however, the counted value may differ by only 0.1% even in the case that the FG signals outputted by the FG signal generation circuit within one period of the control signals, that is to say, the pulses of the frequency corresponding to the tape speed are counted. Accordingly, there is little difference between the broadcasting systems concerning the number of revolutions of the rotating cylinder or the transfer speed of the magnetic tape. In such a method, however, there is the problem that the broadcasting system of the video signals recorded on a magnetic tape cannot be specified.

SUMMARY OF THE INVENTION

The present invention provides an information recorder/reproducer which records, on a magnetic tape, video signals having the number N of tracks corresponding to a broadcasting system for each basic unit of the video and control signals corresponding to each track. The information recorder/reproducer according to the present invention has a capstan for transferring a magnetic tape in the longitudinal direction, an FG signal generation unit for outputting FG signals that are proportional to the number of revolutions of the capstan, a fixed head for recording or reproducing control signals on or from positions in the longitudinal direction of the magnetic tape corresponding to each track and a recording control signal generation unit for generating control signals, of which the duties differ for every N tracks, corresponding to each track and which are outputted to the fixed head. In addition, the device has a control signal amplification unit for amplifying differential control signals reproduced by the fixed head, a waveform formation unit for generating CTL signals which differentiate a positive polarity to negative polarity section from a negative polarity to positive polarity section in one period of the differential control signals amplified in the control signal amplification unit, a CTL signal duty ratio determination unit for detecting the duty ratio of a positive polarity to negative polarity section to a negative polarity to positive polarity section in one period of the differential control signals from CTL signals outputted from the waveform formation unit and FG signals from the FG signal generation unit, a CTL signal counting unit for counting the number of outputs of the CTL signals obtained by the waveform formation unit, and a broadcasting system determination unit for determining the broadcasting system of the video signals recorded on the magnetic tape based on the outputs of the CTL signal duty ratio determination unit and the outputs of the CTL signal counting unit.

The number of tracks for a basic unit has been decided in advance in accordance with the broadcasting system and the video signals can be determined by recording and reproducing the control signals of which the duty ratios differ for each number of tracks.

In addition, in this information recorder/reproducer, in the case when the number N of the control signals recorded in one frame or in one field of the magnetic tape for each basic unit of the video is 5n (n is a natural number) in the NTSC system or 6n in the PAL system, the broadcasting system determination unit determines whether the CTL signals which have a predetermined duty ratio recorded in the border of one frame or one field are inputted for every N=5n or for every N=6n based on the determination result of the CTL signal duty ratio determination unit and the counted value in the CTL signal counting unit so that the broadcasting system can be determined to be the NTSC system in the case of N=5n and can be determined to be the PAL system in the case of N=6n.

DETAILED DESCRIPTION OF THE PREFERRED EMBODIMENTS

Figure 3:
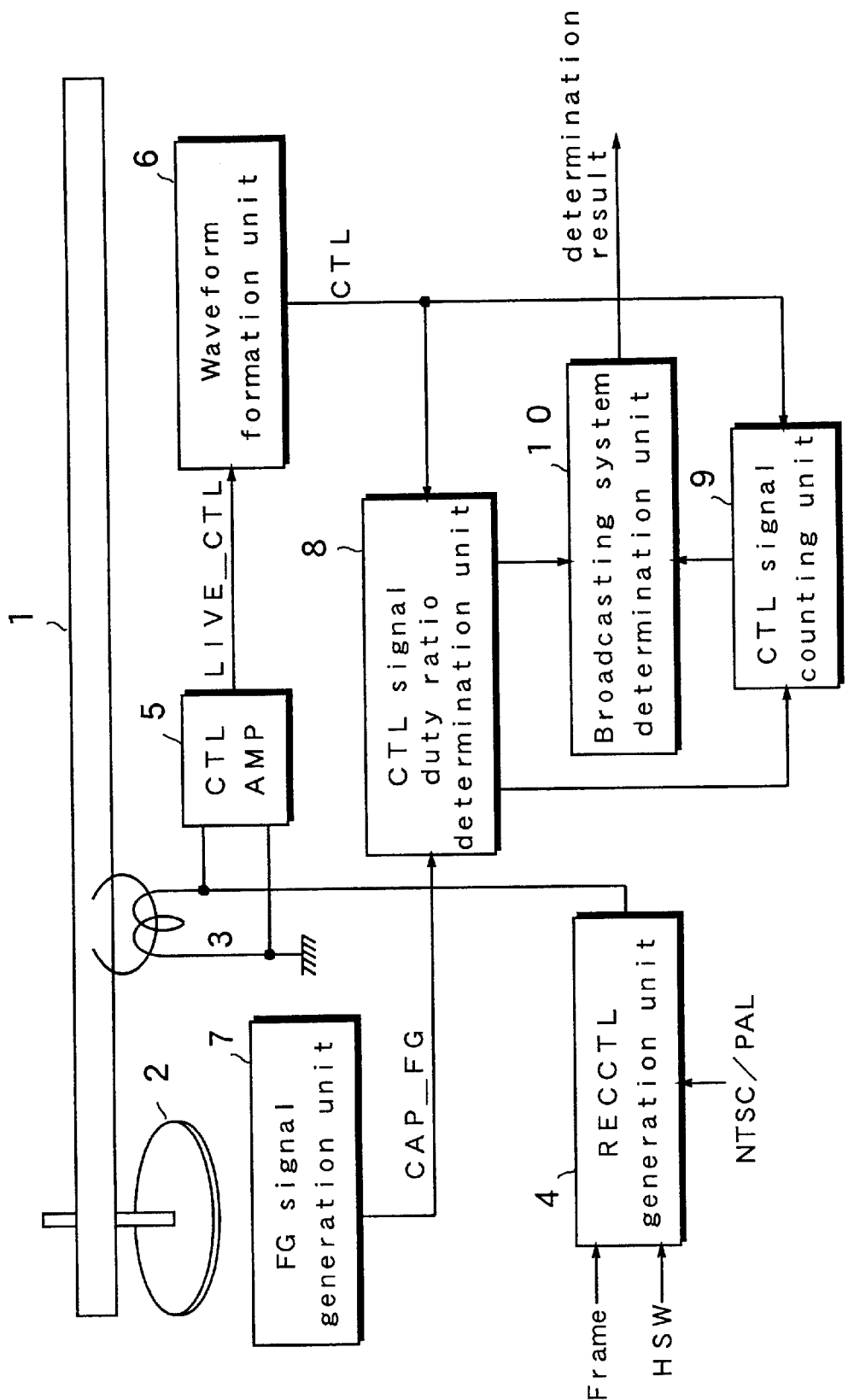
FIG. 3 is a block diagram showing a configuration of the main components of an information recorder/reproducer according to an embodiment of the present invention.

FIG. 3 is block diagram showing a configuration of major components of an information recorder/reproducer having a broadcasting system determination function according to the present embodiment. In FIG. 3 a magnetic tape 1 is pinched between a capstan 2 and a pinch roller, which is not shown, so as to run in the longitudinal direction in accordance with the revolutions of the capstan 2. A fixed head 3 records control signals on or reproduces control signals from the magnetic tape 1. At the time of recording video signals, the duty ratio of the control signals with respect to each track, excluding the border frame, is set at 1:1. That is to say, the period of H level and the period of L level are made equal. In contrast to that, the duty ratio of the control signals (CTL signals) with respect to the tracks located in the border of the frame is set at a ratio other than 1:1. Here, H period>L period. A recording control signal generation unit (hereinafter referred to as an RECCTL generation unit) 4 generates control signals (RECCTL signals) for writing in the duty ratio set in the above manner, which are written in by the fixed head 3.

Figure 4:
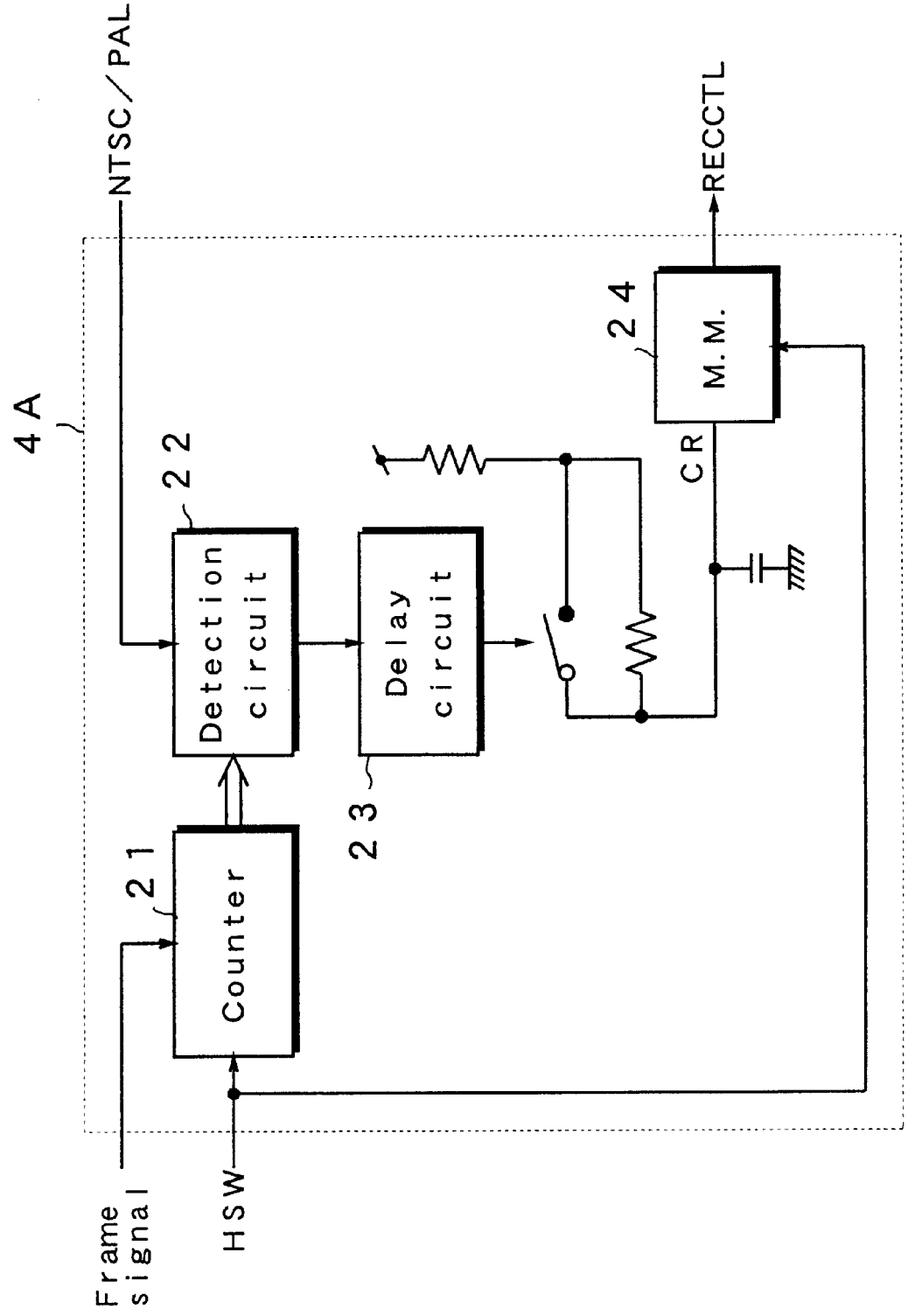
FIG. 4 is a block diagram showing one example of a recording control signal generation unit according to the present embodiment.
Figure 5:
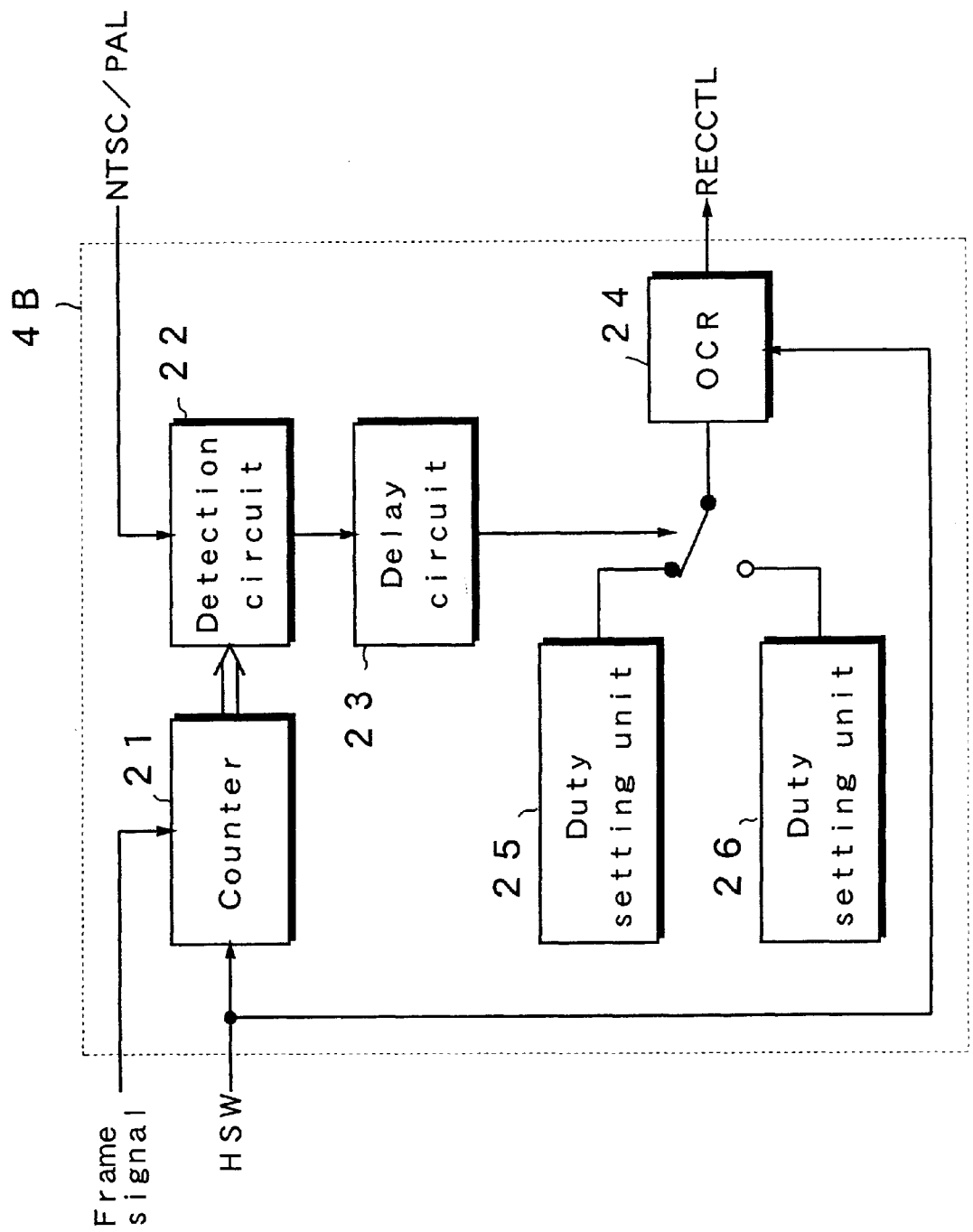
FIG. 5 is a block diagram showing another example of a recording control signal generation unit according to the present embodiment.

Here, the detail of the RECCTL generation unit 4 is described in reference to FIGS. 4 and 5. FIG. 4 is a block diagram showing an RECCTL generation unit 4A according to the first example. Frame signals where one frame becomes one period and head switching signals (HSW signals) for switching each track are given to a counter 21. The counter 21 is a counter which counts the leading edges of the HSW signals and which is reset at the trailing edges of the frame signals. A detection circuit 22 counts 4 in the case of the NTSC system and 5 in the case of the PAL system as the counting value of the counter 21 and gives the output to a delay circuit 23. The delay circuit 23 is a delay circuit for delaying inputs for a period which is longer than the H period of the control signals and which is shorter than one period of the HSW signals, and changes the time constant of a monostable multivibrator (MM) 24 by means of this p output. The monostable multivibrator 24 gives the part other than the final track of one frame the duty ratio of 1:1 by triggering by means of the HSW signals and generates an RECCTL signal where the duty ratio is switched in the final track.

FIG. 5 is block diagram showing an RECCTL generation unit 4B according to another example. Here, a duty setting unit 25 which gives duty of 1:1 and a duty setting unit 26 which sets the duty at a ratio other than 1:1 are used. A timer synchronizing output unit (output compare register: OCR output) 27 is a timer synchronizing output circuit of a microcomputer. Then, by switching the set value of the duty setting unit by means of the output of the delay circuit 23, which is set in the timer synchronizing output unit 27, a signal of a predetermined duty ratio can be obtained.

Figure 6:
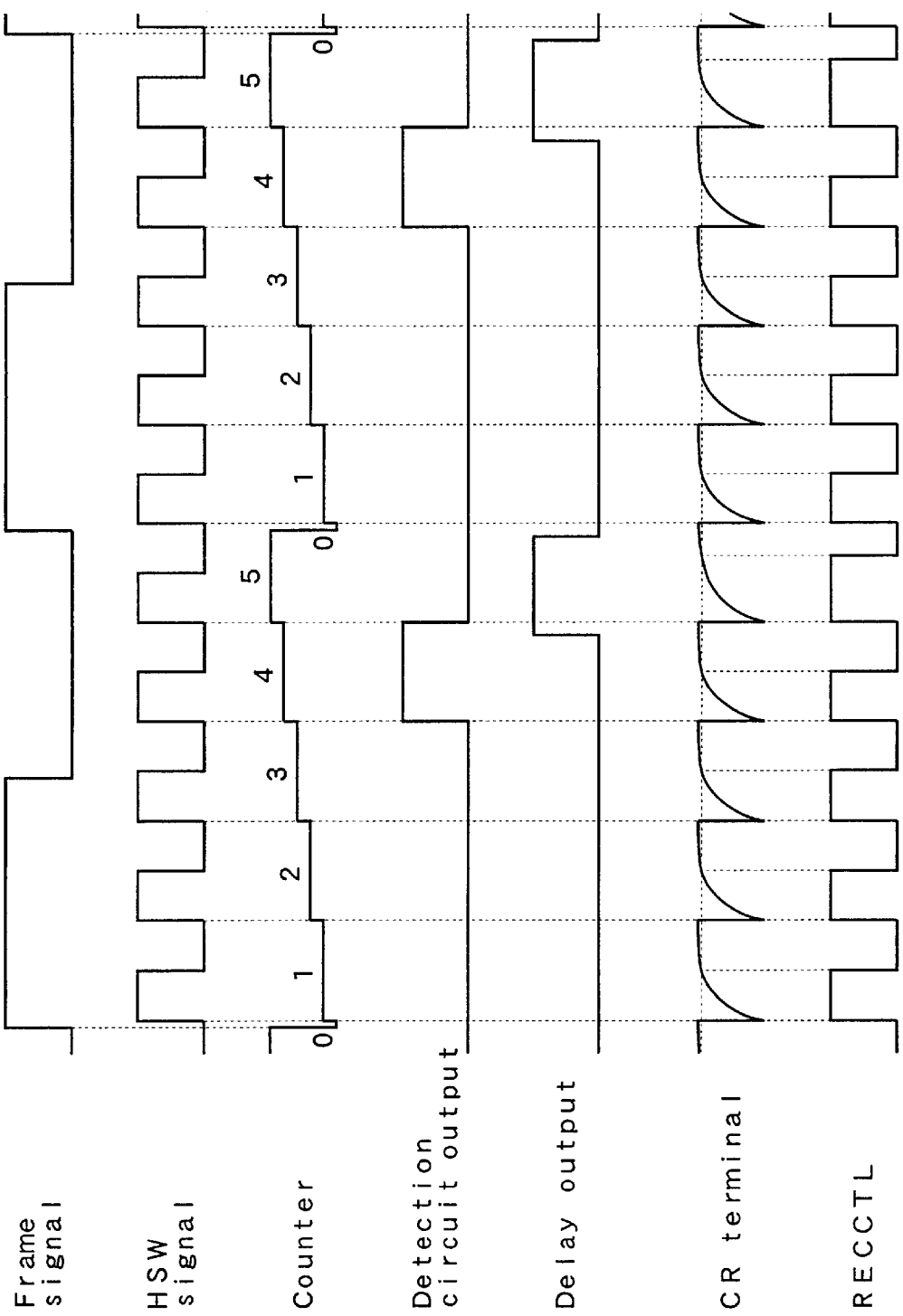
FIG. 6 is a timing chart showing the operation of the recording control signal generation unit shown in FIG. 4.

Next, the operation of writing in control signals at the time of reproduction of the video signals is described. FIG. 6 is a timing chart showing the operation of the recording control signal generation unit 4A shown in FIG. 4 in the case of, for example, the NTSC system. In the case that a frame signal and a head switching signal (HSW), as shown in FIG. 6, are given, the counter 21 sequentially increases the counted value in accordance with the HSW signal and an output is obtained at 4 from a detection circuit 22. Thereby, the delay circuit 23 operates so as to switch the time constant of CR. Accordingly, an RECCTL signal as shown in FIG. 6 is obtained from the monostable multivibrator 24. In the case of the PAL system, a similar operation is carried out when the counted value of the counter 21 is 5.

Figure 7:
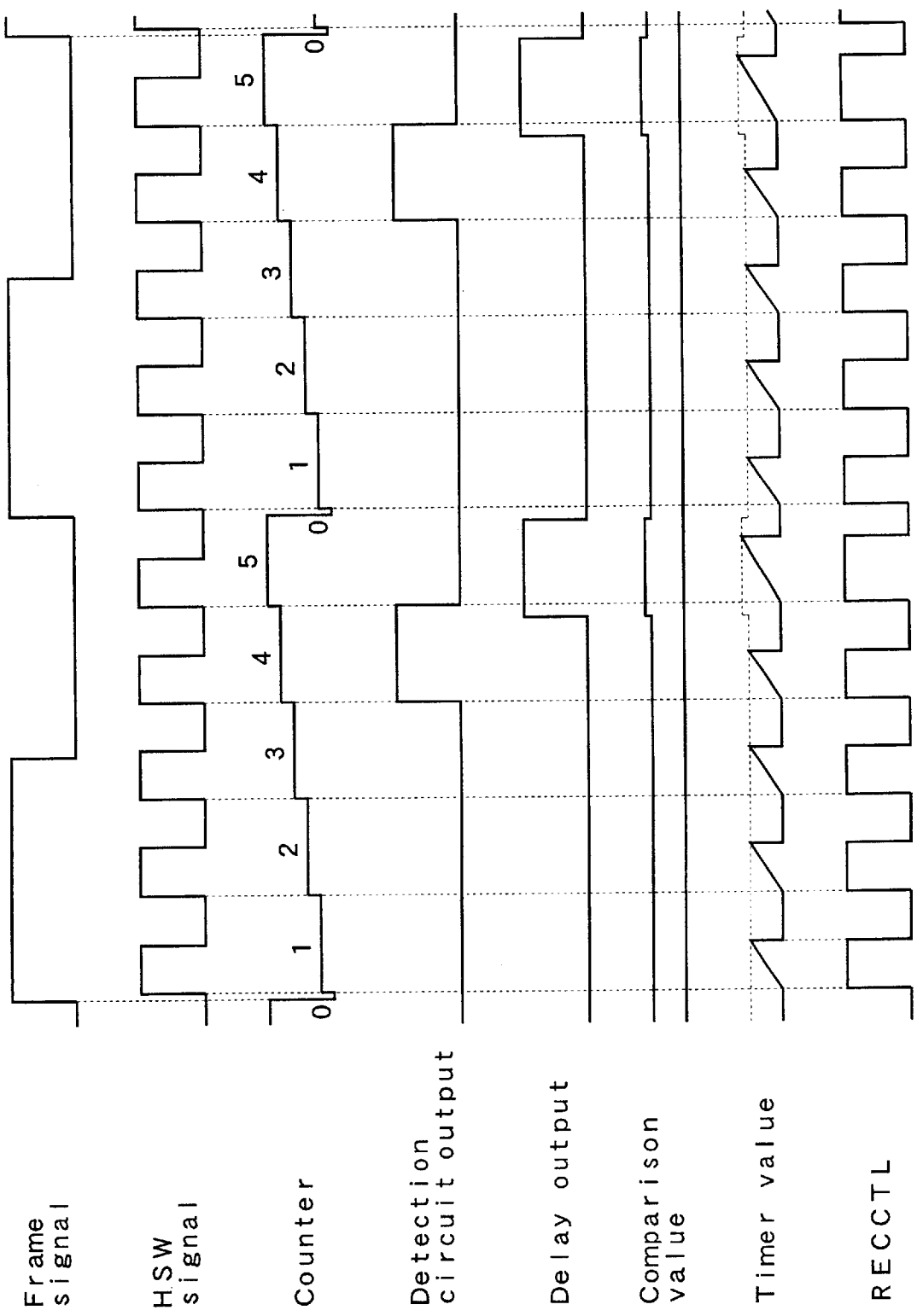
FIG. 7 is a timing chart showing the operation of the recording control signal generation unit shown in FIG. 5.

Next, FIG. 7 is a timing chart showing the operation of the recording control signal generation unit 4A shown in FIG. 5. When a frame signal and an HSW signal, as shown in FIG. 7, as well as a signal that shows the NTSC system are given, the counter 21 outputs a counted output in the same manner so that the duty ratio setting units 25 and 26 are switched by means of the delay circuit 23 and the comparison value is changed. Thereby, the peak of the timer value of the timer synchronizing output unit 27 is also changed so that an RECCTL signal of the duty ratio shown in FIG. 7 is obtained. In the case of the PAL system, a similar operation is carried out changing the comparison value when the counted value of the counter 21 is 5.

Figure 8:
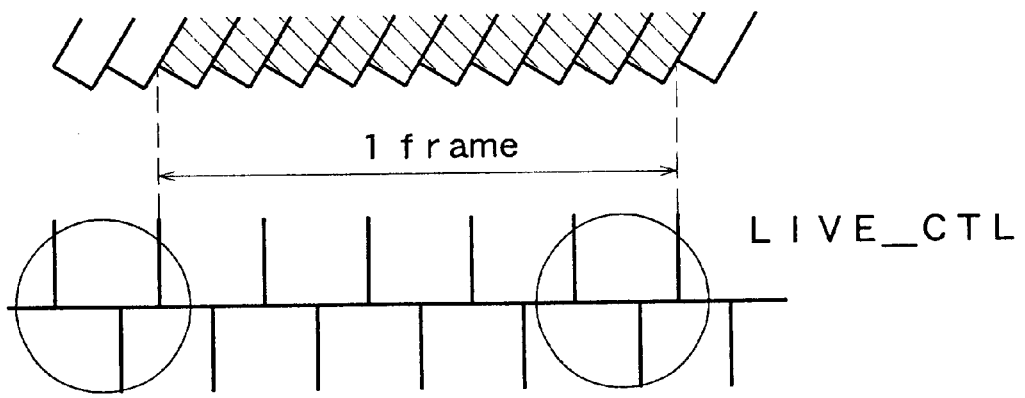
FIG. 8 is an explanatory diagram showing the relationship between the tracks recorded on a magnetic tape and the duty ratio of control signals in accordance with the NTSC broadcasting system in the information recorder/reproducer according to the present embodiment.
Figure 9:
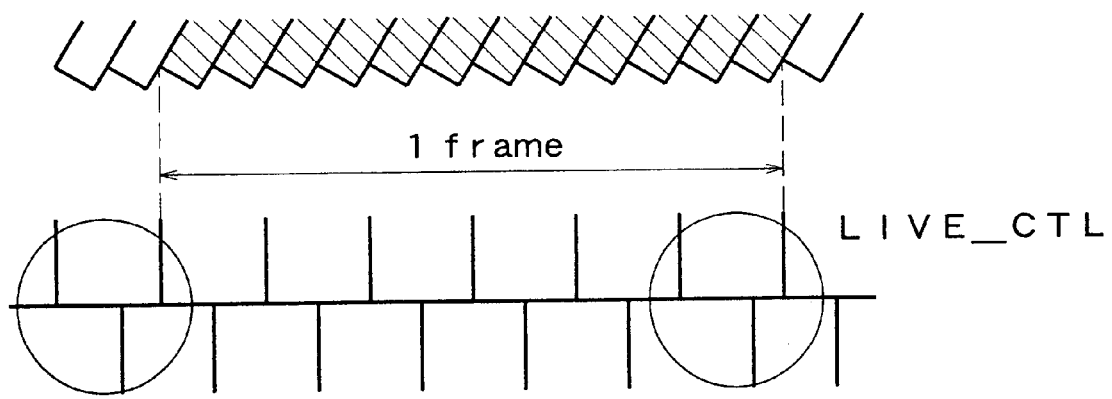
FIG. 9 is an explanatory diagram showing the relationship between the tracks recorded on a magnetic tape and the duty ratio of control signals in accordance with the PAL broadcasting system in the information recorder/reproducer according to the present embodiment.

Next, a configuration and operation for reproduction are described. FIG. 8 is an explanatory diagram showing the relationships between the duty ratio of the control signals, recorded on the magnetic tape in accordance with the broadcasting system in the case of the NTSC system, and the number of tracks of one frame. FIG. 9 is an explanatory diagram showing the relationships between the duty ratio of the control signals, recorded on the magnetic tape in the case of the PAL system, and the number of tracks of one frame. In addition, FIG. 10 is a waveform diagram showing the operation of major components of the information recorder/reproducer of FIG. 3.

A control signal amplification circuit (CTLAMP) 5 amplifies a reproduced differential control signal and gives the amplified differential control signal (hereinafter referred to as LIVE_CTL signal) to a waveform formation unit 6.

As shown in FIG. 8 or 9, the tracks recorded on the magnetic tape 1 and the differential control signals obtained from the fixed head 3 are mutually synchronized.

Figure 10:
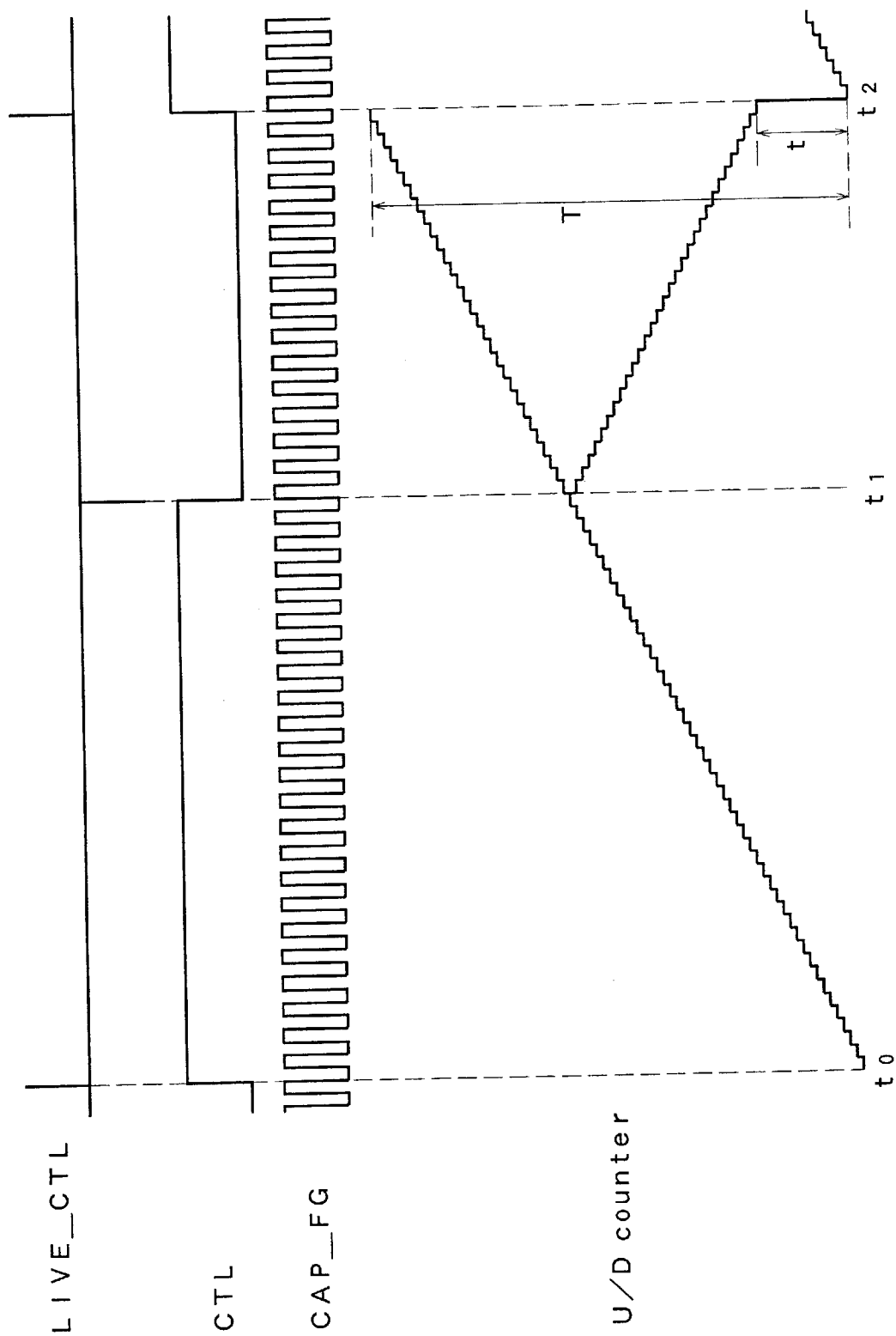
FIG. 10 is a timing chart showing the operation of a CTL signal duty ratio determination unit in the information recorder/reproducer according to the present embodiment.

At the time of the reproduction of video signals, the control signals are read out by the fixed head 3 and are amplified by the control signal amplification circuit 5 so as to gain LIVE_CTL signals shown in FIGS. 8 to 10. The waveform formation unit 6 of FIG. 3 forms a waveform which changes to the H level when the LIVE_CTL signal 5 is of the positive polarity and which changes to the L level when the LIVE_CTL signal 5 is of the negative polarity so as to gain a control signal (CTL signal) which has the a similar waveform at the time of recording as shown in FIG. 10. The duty ratio of this CTL signal becomes 1.0:1.0 as shown in FIGS. 8 and 9 at the time of the reproduction of tracks other than those in the border of one frame. In addition, the duty ratio becomes of a value other than 1:1 at the time of reproduction of the tracks in the border part of one frame, as indicated by the circles in FIGS. 8 and 9. For example, in FIG. 10 the duty ratio becomes 1.2:0.8. During this time an FG signal (hereinafter referred to as CAP_FG signal) as shown in FIG. 10 is outputted from an FG signal generation circuit 7 of the capstan 2.

Figure 11:
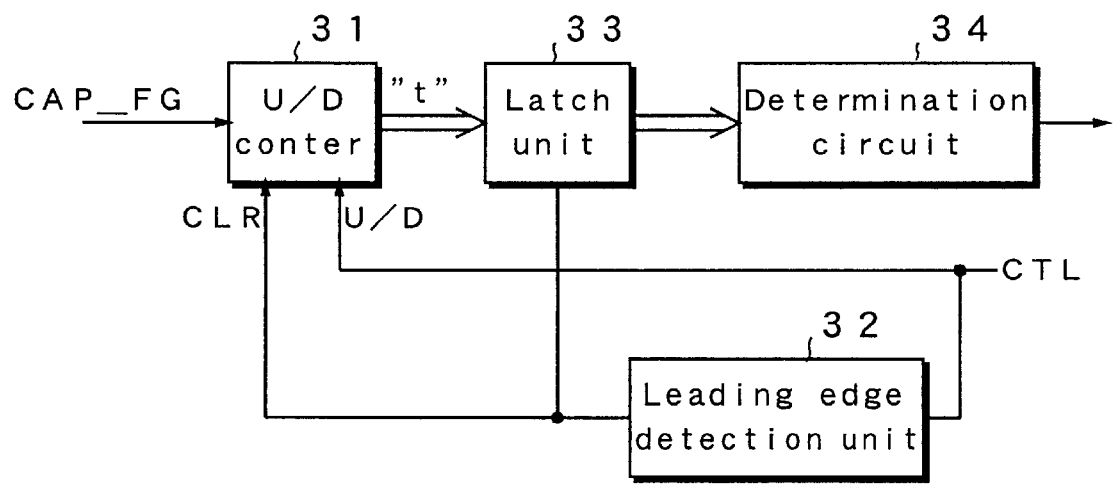
FIG. 11 is a block diagram showing a configuration of the CTL signal duty ratio determination unit according to the present embodiment.

The CTL signal, of which the waveform formation unit 6 forms the waveform, and the above-described CAP_FG signal are inputted into a CTL signal duty ratio determination unit 8. FIG. 11 is a block diagram showing a detailed configuration of the CTL signal duty ratio determination unit 8. The CAP_FG signal is inputted into an up-down counter 31. The control signal is inputted into the up-down counter as an up or a down count signal. In addition, the control signal is inputted into the up-down counter 31 as a clear signal via a leading edge detection unit 32. Accordingly, the up-down counter 31 clears the counted value at the leading edge of the CTL signal at time t0 as shown in FIG. 10 and counts up the number of pulses of the CAP_FG signal inputted when the CTL signal is at the H level. Then, when the CTL signal changes to the L level at time t1, the number of pulses of the CAP_FG signal inputted at, and after, this time is counted down. The output immediately before the clearance of the up-down counter 31 is latched at a latch unit 33 so that the duty ratio can be determined by the output thereof.

The number of pulses of the CAP_FG signal, which occurs during one period of the CTL signal, is assumed to be T and the counted value remaining in the up-down counter 31 when the leading edge of the next CTL signal comes, as shown at time t2 in FIG. 10, is assumed to be t, is latched in the latch unit 33. Then, the determination unit 34 determines the duty ratio of the positive pole to the negative pole of the CTL signal as (T+t:T−t). At the time of the reproduction of the tracks excluding those in the border of one frame the duty ratio is 1:1 and when the duty ratio is detected to have changed to (T+t:T−t), the determination unit 34 determines that the track scanned at present is either a starting track or a finishing track of one frame. Thereby, frame signals can be generated. This frame signal is inputted into a CTL signal counting unit 9.

Figure 1:
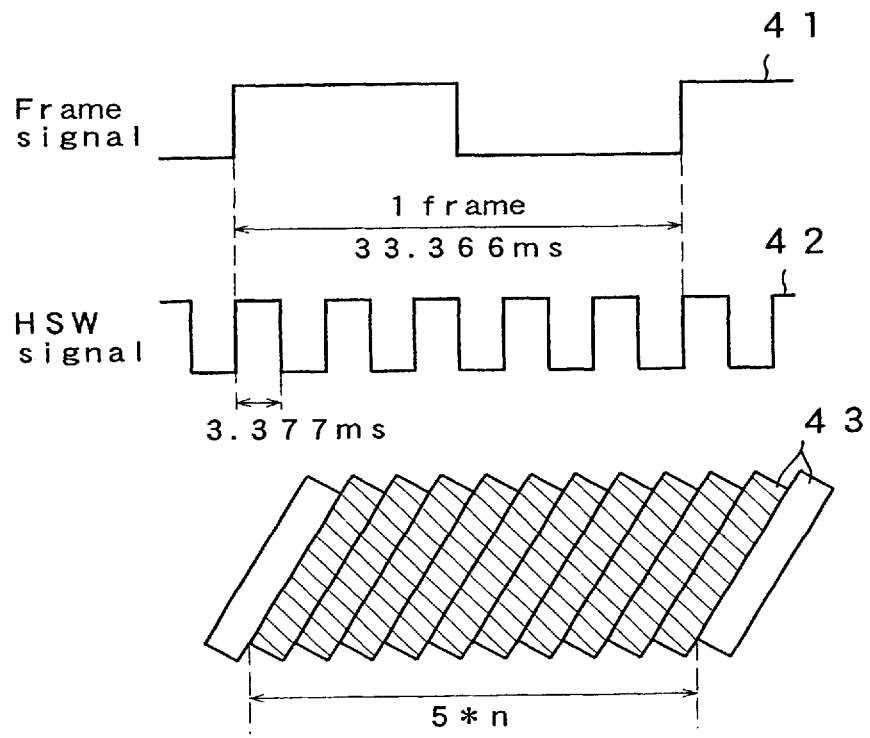
FIG. 1 is an explanatory diagram showing the relationship of the number of tracks in one frame in accordance with the NTSC system.
Figure 2:
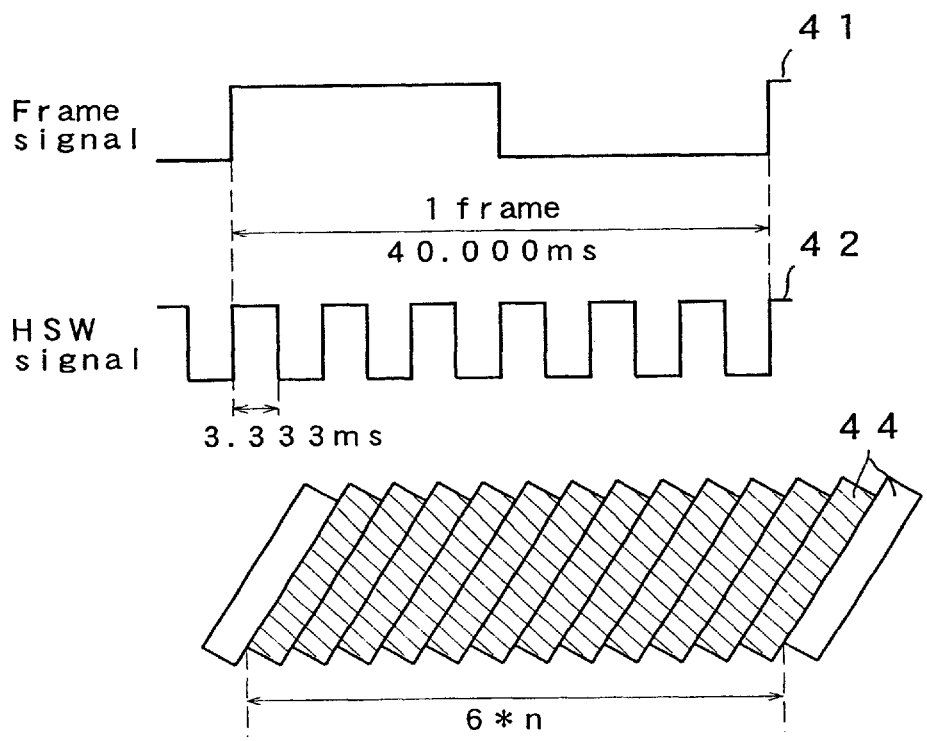
FIG. 2 is an explanatory diagram showing the relationship of the number of tracks in one frame in accordance with the PAL system.

The CTL signal counting unit 9 counts the number of CTL signals within one frame by using a frame signal outputted from the CTL signal duty ratio determination unit 8. Then, the determination result of the CTL signal duty ratio determination unit 8 and the result of the counting at the CTL signal counting unit 9 are inputted into a broadcasting system determination unit 10 which determines whether the CTL signals which have a predetermined duty ratio (T+t:T−t) recorded at the end of one frame as shown in FIGS. 9 and 10 are to be inputted for every CTL signal of N=5n or are to be inputted for every CTL signal of N=6n. Here, n is natural number. When the CTL signals which have a predetermined duty ratio (T+t:T−t) are counted the counted value indicates the number of tracks of one frame. Then, in the case of N=5n it is determined to be the NTSC system and in the case of N=6n it is determined to be the PAL system. In the case of FIGS. 1 and 2 it is determined to be the NTSC system if N=10 and it is determined to be the PAL system if N=12. Here, the broadcasting system can be correctly determined even in the case of a high speed reproduction or a slow reproduction of the magnetic tape by using an FG signal.

Here, in the above description, though the example where the waveform formation of the LIVE_CTL signal is configured to have become H in the positive polarity and to have become L in the negative polarity is described, the configuration where it becomes L in the positive polarity while it becomes H in the negative polarity can also be implemented in the same manner. In addition, though an example where the basic unit of compression is configured of one frame is described, the case where the basic unit is one field can also be implemented in the same manner. Image signals of either the NTSC system or the PAL system can be recorded by using this information recorder/reproducer and the recorded magnetic tape can be reproduced by using the same device or by using another information recorder/reproducer.

As described above, according to the present invention, programs can be recorded by using an information recorder/reproducer where the number of revolutions of the rotating cylinder and the tape transfer speed at the time of recording are approximately the same even in the case that different broadcasting systems exist. In addition, it can be automatically determined from the magnetic tape, on which the programs are recorded in such a manner, which broadcasting system was used to record video signals. Furthermore, the broadcast programs of the NTSC system or the PAL system can be identified and reproduced by using one type of information recorder/reproducer.

Industrial Applicability

The present invention provides an implementation of an information recorder/reproducer that can record video signals so that the broadcasting system can be identified at the time of reproduction even in the case that differing broadcasting systems exist and that can determine the broadcasting system of the video signals at the time of the reproduction even in a digital VTR of which the number of revolutions of the rotating cylinder and the transfer speed of the magnetic tape at the time of recording are fixed.

What is claimed is:

1. An information recorder/reproducer which records video signals having the number N of tracks corresponding to a broadcasting system for each basic unit of video signals and corresponding to the broadcasting system and control signals corresponding to each of said tracks on a magnetic tape and which reproduces these signals, comprising:
    a capstan for transferring said magnetic tape in a am longitudinal direction thereof;
    an FG signal generation unit for outputting FG signals proportional to a number of revolutions of said capstan;
    a fixed head for recording and reproducing said control signals which correspond to each of said tracks in the positions along said longitudinal direction of said magnetic tape;
    a recording control signal generation unit for generating control signals which correspond to each track and of which the duties differ for every N tracks and which are outputted to said fixed head;
    a waveform formation block for generating control signals at the time of recording based on the signals reproduced by said fixed head;
    a CTL signal duty ratio determination unit for detecting a duty ratio of a positive polarity to negative polarity section to a negative polarity to positive polarity section in one period of said control signals, from the control signals outputted from said waveform formation block, and from FG signals of said FG signal generation unit;
    a CTL signal counting unit for counting the number of outputs of said control signals obtained by said waveform formation block; and
    a broadcasting system determination unit for determining the broadcasting system of the video signals recorded on said magnetic tape based on the output of said CTL signal duty ratio determination unit and the output of said CTL signal counting unit.

2. The information recorder/reproducer according to claim 1, wherein said recording control signal generation unit comprises:
    a counter for counting head switching signals during one period of a frame signal;
    a detection circuit for detecting a predetermined value of said counter; and
    a monostable multivibrator for outputting control signals of a duty ratio of a time constant set in said detection circuit in accordance with the head switching signals.

3. The information recorder/reproducer according to claim 1, wherein said recording control signal generation unit comprises:
    a counter for counting head switching signals during one period of a frame signal;
    a detection circuit for detecting a predetermined value of said counter;
    first and second duty ratio setting units for setting different duty ratios; and
    a timer synchronizing output unit for switching duty ratio setting values based on an output of said detection circuit so as to generate control signals.

4. The information recorder/reproducer according to claim 1, wherein said waveform formation block comprises:
    a control signal amplification unit for amplifying a differential control signal reproduced by said fixed head; and
    a waveform formation unit for generating a control signal which differentiates a positive polarity to negative polarity section from a negative polarity to positive polarity section in one period of the differential control signal amplified by said control signal amplification unit.

5. The information recorder/reproducer according to claim 1, wherein said CTL signal duty ratio determination unit comprises:
    an up-down counter for counting up and for counting down said FG signals between positive polarities thereof and between negative polarities thereof, respectively, within one period of a control signal; and
    a determination circuit for determining a duty ratio of said control signals based on a number of pulses of said FG signal within one period of said control signal and a counted value of said up-down counter.

6. The information recorder/reproducer according to claim 1, wherein
    in the case when a number N of said control signals recorded, on said magnetic tape, in one frame or one field, which are basic units of videos, is 5n or 6n (n is a natural number),
    said broadcasting system determination unit determines whether the control signals which have a predetermined duty ratio recorded in the border of one frame or one field are inputted for every N=5n or for every N=6n based on the determination result of said CTL signal duty ratio determination unit and a counted value of said CTL signal counting unit so that in the case of N=5n the system is determined to be of the NTSC system and in the case of N=6n the system is determined to be of the PAL system.

7. An information recorder/reproducer for recording, on a magnetic tape, video signals, which have a number N of tracks of 5n or of 6n (n is a natural number) corresponding to the NTSC or the PAL broadcasting system for each for each basic unit of video signals, and control signals corresponding to each of said tracks and for reproducing these signals, comprising:
    a capstan for transferring said magnetic tape in a longitudinal direction thereof;
    an FG signal generation unit for outputting FG signals proportional to a number of revolutions of said capstan;
    a fixed head for recording and reproducing said control signals which correspond to each of said tracks in the positions along said longitudinal direction of said magnetic tape;
    a recording control signal generation unit for generating control signals which correspond to each track and of which the duties differ for every N tracks and which are outputted to said fixed head;
    a control signal amplification unit for amplifying a differential control signal reproduced by said fixed head;
    a waveform formation unit for generating a control signal which differentiates a positive polarity to negative polarity section from a negative polarity to positive polarity section in one period of the differential control signal amplified by said control signal amplification unit;
    a CTL signal duty ratio determination unit for detecting a in duty ratio of a positive polarity to negative polarity section to a negative polarity to positive polarity section in one period of said control signals, from control signals outputted from said waveform formation unit, and from FG signals of said FG signal generation unit;

a CTL signal counting unit for counting the number of outputs of the control signals obtained by said waveform formation unit; and a broadcasting system determination unit for determining the broadcasting system of the video signals recorded on said magnetic tape based on the output of said CTL signal duty ratio determination unit and the output of said CTL signal counting unit, wherein said CTL signal duty ratio determination unit includes:

an up-down counter for counting up and for counting down said FG signals between positive polarities and between negative polarities, respectively, within one period of a control signal; and a determination circuit for determining a duty ratio of said control signals based on a number of pulses of said FG signals within one period of said control signal and the counted value of said up-down counter; and wherein said broadcasting system determination unit determines whether the control signals which have a predetermined duty ratio recorded in the border of one frame or one field are inputted for every N=5n or for every N=6n based on the determination result of said CTL signal duty ratio determination unit and a counted value of said CTL signal counting unit so that in the case of N=5n the system is determined to be the NTSC system and in the case of N=6n the system is determined to be the PAL system.

* * * * *